C. CUAU.
CONSTRUCTION OF RADIATORS FOR COOLING THE CIRCULATING WATER IN EXPLOSION MOTORS.
APPLICATION FILED MAR. 12, 1918.
1,353,322. Patented Sept. 21, 1920.
5 SHEETS—SHEET 1.
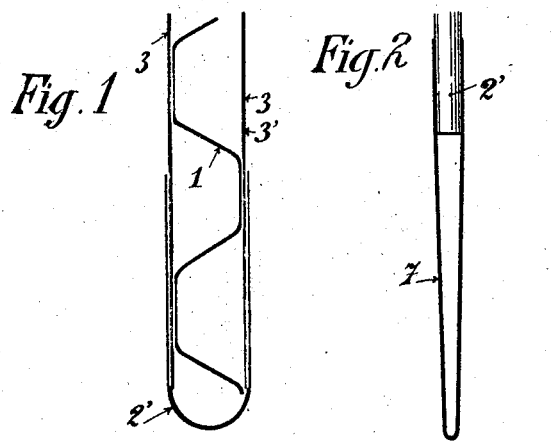
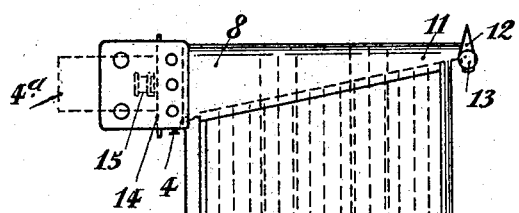
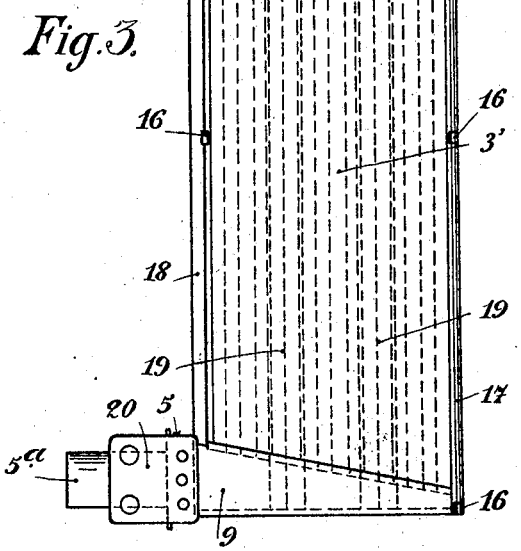

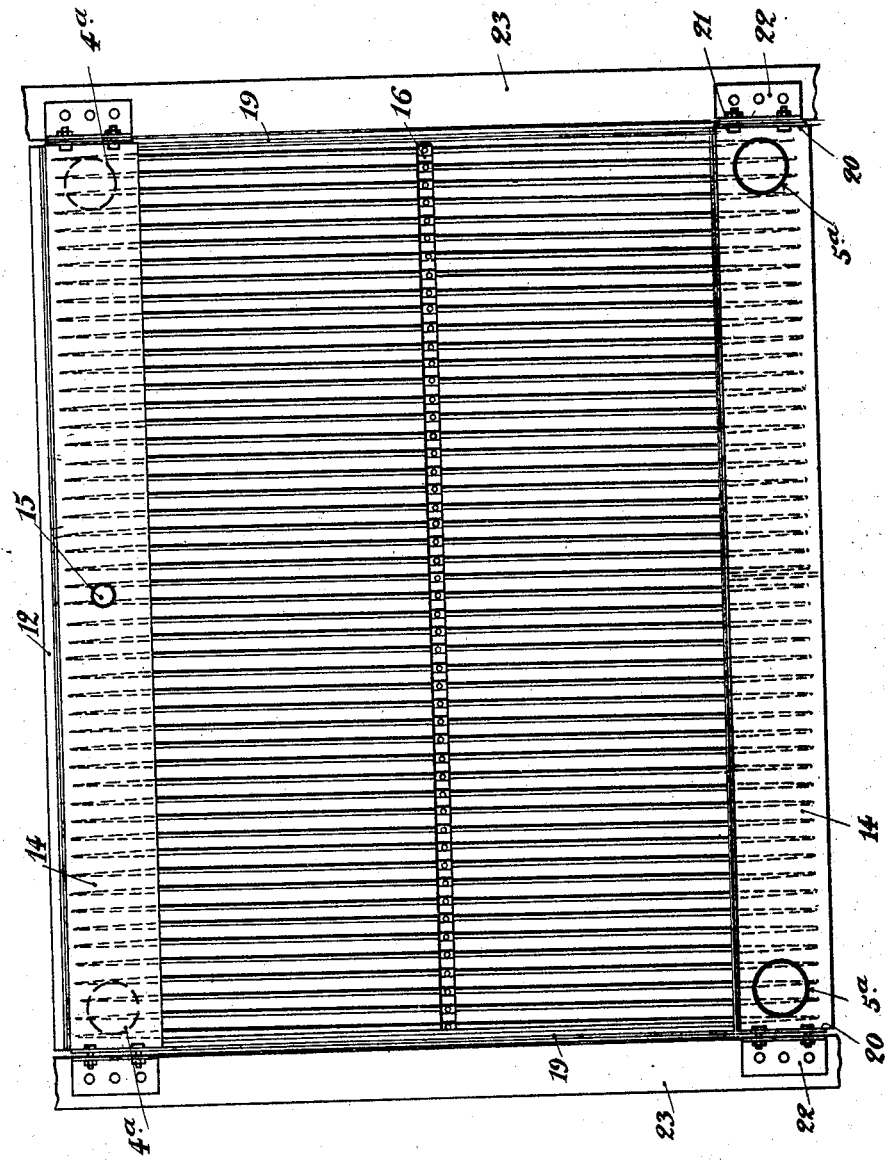

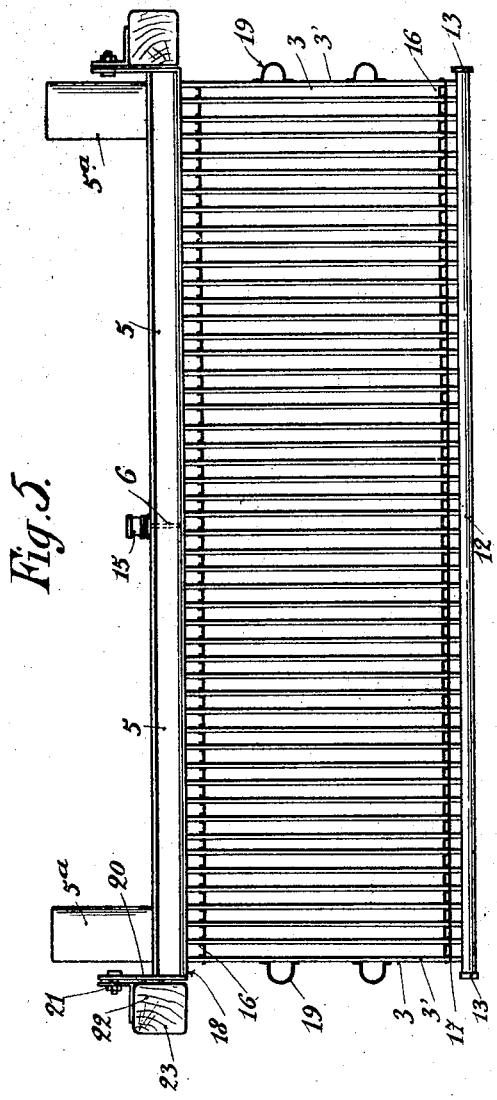

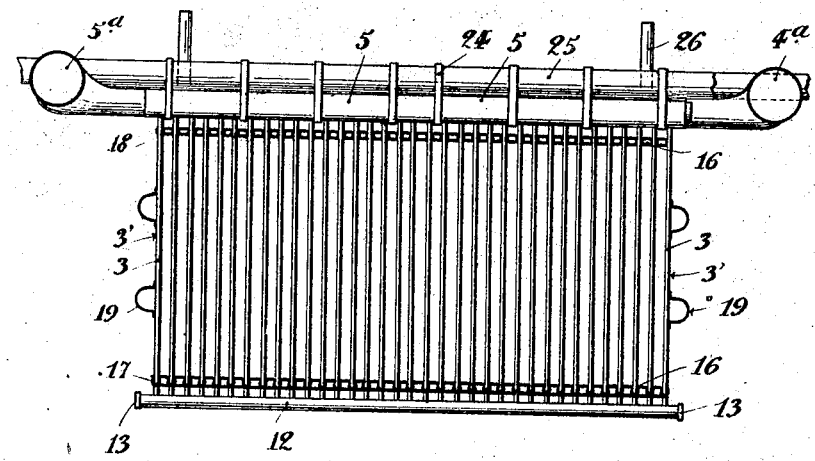
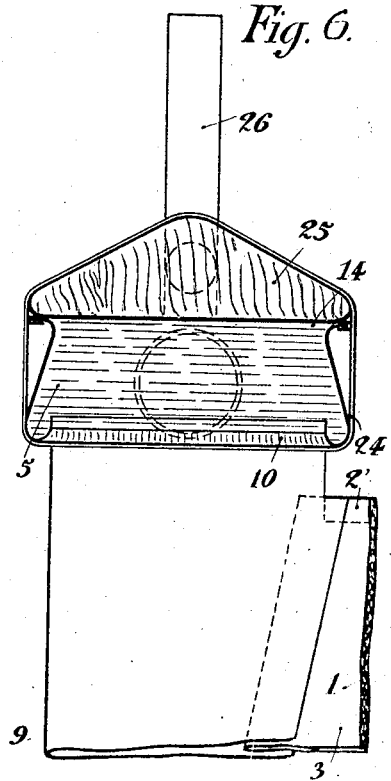
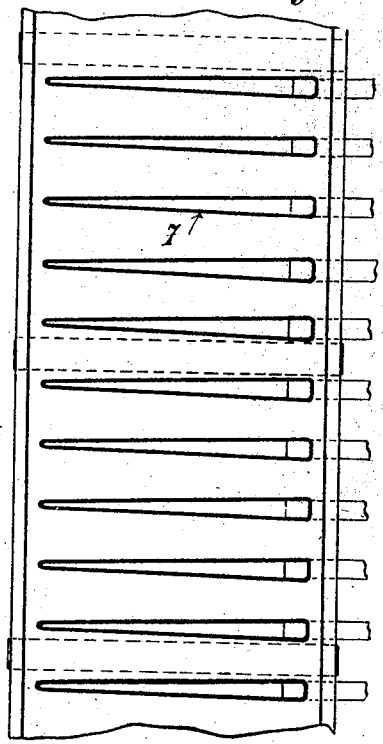

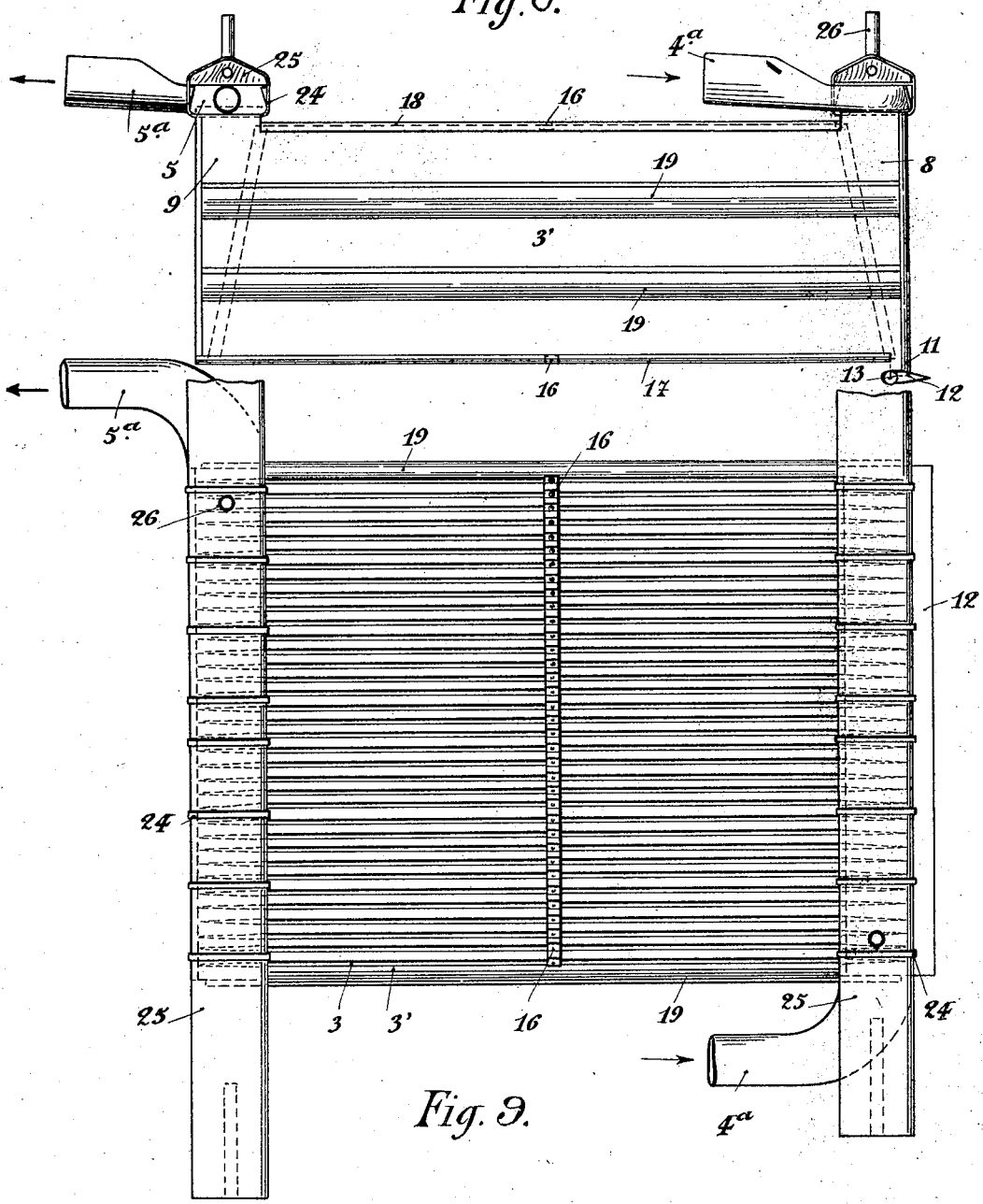

UNITED STATES PATENT OFFICE.

CHARLES CUAU, OF PARIS, FRANCE.

CONSTRUCTION OF RADIATORS FOR COOLING THE CIRCULATING WATER IN EXPLOSION-MOTORS.

1,353,322.   Specification of Letters Patent.   Patented Sept. 21, 1920.

Application filed March 12, 1918. Serial No. 221,907.

*To all whom it may concern:*

Be it known that I, CHARLES CUAU, citizen of the French Republic, residing at 10 Place Saint-François-Xavier, Paris, France, have invented certain new and useful Improvements in the Construction of Radiators for Cooling the Circulating Water in Explosion-Motors, of which the following is a specification.

My invention relates to radiators, more particularly of the type used on motors for automobiles, air-craft, and the like.

The object of the invention is to reduce both the weight of the metal of a radiator and the weight of the cooling water, thus enabling a radiator to be built which is excellently adapted for flying-machine engines. To that end, the radiating elements have extremely thin walls and these walls have only narrow spaces between them for the circulation of the water. Yet the walls are strong enough to withstand a sufficient internal pressure and on the other hand, yield to external pressure, without however, by their mutual approach under such pressure forming an obstruction to the circulation of the water.

In the drawing Figure 1 illustrates approximately ten times full size a transverse section of the lateral border of a radiating element; Fig. 2 illustrates a distributor; Figs. 3, 4 and 5 illustrate respectively in front, side and plan view further modifications; Figs. 6 and 7 show details of construction; Figs. 8, 9 and 10 are similar views as Figs. 3, 4 and 5 showing other modifications.

According to Fig. 1, the corrugated metal stay-sheet 1 is fastened to a continuous wall sheet 3, by which it is surrounded. A hollow frame 2' of thin metal (four-tenths of a millimeter) is soldered to the external surface of the wall 3. The soldering between the various sheets may be readily effected by lining the wall-sheet 3 with a thin sheet of tin. The assembled parts while being maintained in their relative positions are then brought to a suitable temperature until the contacting surfaces are soldered to each other.

In order to insure return circulation in the radiating elements use is made of so-called distributers 7, formed of thin metal (3/10 or 4/10 of a millimeter) and soldered both to the wall 3 and the frame-member 2' as shown in cross-section in Fig. 2.

The edges of these distributers are tapered.

The distributers when seen laterally have an elongated trapezoidal form as shown in side elevation in Fig. 3, where the enveloping wall 3 is so shaped that with its inlet-distributer 8 (rear of the radiator) and outlet-distributer 9 (front of the radiator) it presents a rectangular form seen from the side.

The distributers 8 and 9 are therefore like flat tubes of decreasing cross-section, their maximum width being at the upper end and their minimum width at the lower end.

This upper part of the distributers 8, 9 which part assumes the shape of a tube of triangular cross section enters the inlet collector 4 and outlet collector 5 respectively (see Fig. 3).

These collectors 4 and 5 consist at the lower part of a tubular plate perforated with openings regularly spaced into which the distributing tubes 8, 9 enter, the said tubes being preferably soldered to the said tubular plate.

The distributers 8 placed at the rear of the radiator (which is the lowest part when the air-craft is on the ground, the radiator being placed under the fuselage or under the wings) are extended dowward by a discharge tube 11 (Fig. 3) which is integral with the distributer and the wall of which opposite to the tapered edge is closed by a preferably soldered fastening.

All discharge tubes are united by a draining collector 12, tapered so as to reduce its resistance to forward motion. This collector carries drain plugs 13 at each extremity, so that the radiator may be completely emptied no matter on what side the air-craft leans on the ground.

The water-inlet nozzle 4$^a$ and outlet nozzle 5$^a$ feeding the collectors may be of any suitable form and arrangement.

In the constructions illustrated in Figs. 3, 4 and 5, the nozzles are preferably soldered on to the cover 14 (Fig. 6) of the collectors.

The circulation of the water in the radiator may be effected either in series or in parallel.

In the first case the water-admission nozzle and the water-outlet nozzle are arranged on the same collector (front collector) as seen in the construction shown in full lines in Figs. 3, 4 and 5.

The collector bearing the nozzles is then divided into two independent compartments by a partition 6 (Fig. 5).

In order to allow, with this connection, of the complete evacuation of air from the rear collector having no nozzle, an air-scavenger 15 is arranged on the said collector (Figs. 3, 4 and 5).

Since hydraulic connection causes considerable losses of pressure, because of the length of the path traveled by the water in the radiator and the numerous changes of direction of the stream lines, it is preferable to arrange nozzles on each collector the water-inlet nozzles $4^a$ being placed on the rear collector, as shown in dotted lines in Figs. 3, 4 and 5, and the water-outlet nozzles $5^a$ being placed on the front collector. In that way the water circulates in the radiating elements connected in parallel in the opposite direction to the current of the cooling air, and the losses of head in the radiator are reduced to a minimum because the connecting of the radiating elements in parallel enables twice as great a flow to be obtained with only half as great a loss of head as would be the case with the radiating elements connected in series.

Figs. 8, 9 and 10 show another arrangement of the water-inlet nozzle $4^a$ and water-outlet nozzle $5^a$, these nozzles consisting of curved unions feeding the collectors through their extremities.

For the construction of a radiator having a specified active surface, it is necessary to assemble a large number of elements or units in such a way as to form a radiating bundle. The elements of these bundles might however vibrate in a violent current of air. To obviate this, and to keep the elements properly spaced, corrugated stay bands 16 are preferably soldered at appropriate places on the frame members 2' of the radiating elements (Figs. 3, 4, 5, 8, 9 and 10).

In order to protect the elements against shock, the external surfaces 3' of the two outer elements (Figs. 4, 5, 8, 9 and 10) instead of consisting of a sheet of extremely thin metal (5/100 of a millimeter), are formed of a comparatively thick sheet of metal (4/10 of a millimeter) which replaces in the construction of the radiating element one of its walls 3. The wall 3' is soldered directly to the corrugated stay sheet 1. The internal surface 3 of the outer radiating elements is made, like the other elements, of a bundle, of extremely thin metal.

To prevent the radiating elements from being torn by projections of the ground or by stones at the time of taking flight, a guard plate 17 (Figs. 3, 5, 8 and 10) may be placed under the radiating bundle, and a similar guard plate 18 may be arranged above the bundle.

For the sake of clearness in the drawing, the upper guard plate is assumed to be removed in Figs. 4 and 9, which enables the radiating bundle to be seen in plan with the upper stay band 16.

The protected lateral elements may be stiffened by means of profile ribs 19 preferably soldered to the sheets 3', these ribs being of wide internal cross section for the passage of air (Figs. 3, 4, 5, 8, 9, 10).

In Fig. 3, the ribs 19 are only shown dotted.

By way of example, two types of mounting the radiators have been illustrated;

The first type, which is intended for the purpose of being mounted under the keelson of the aircraft, is illustrated in side elevation in Fig. 3, in plan in Fig. 4, and in front elevation in Fig. 5. As seen in these figures, the radiator is fixed by lugs 20, riveted and soldered to the extremity of the collectors and connected by bolts 21 to other fixing lugs 22, practically integral with the longitudinal supports 23.

The mounting is done in such a way that the undersides of the collector 4, 5 are flush with the lower part of the supports 23, the collectors being thus completely sheltered in the interior of the fuselage of the aircraft, so that the part of the radiator exposed to the cooling air may consist exclusively of the radiating nest of tapered elements offering a minimum resistance to forward motion. The keelson of the aircraft is closed above the radiator by the guard plate 18.

The second type, intended to be mounted either under the keelson or under the wings of the aircraft is shown in side elevation in Fig. 8, in plan in Fig. 9 and in front elevation in Fig. 10.

Here, the radiator is suspended by means of collars 24 passing under the collectors 4, 5 and on a cross bar 25 which is fixed to the keelson of the aircraft. The details of the arrangement of the collars 24 and the bar 25 above the collectors 4, 5 is shown in Fig. 6.

In certain cases the radiator may also be suspended under the wing by means of a locking device passing under the collectors 4, 5, the ribs of the wing being suitably notched, to enable the collectors to be lodged and screened in the wing.

The tubes 26 shown in Figs. 6, 8, 9, 10 are not indispensable to the satisfactory working of the radiator. One of these tubes is placed at the water-inlet $4^a$ and the other at the water-outlet $5^a$. They are for the purpose of enabling a differential pressure gage to be coupled, and the losses in hydraulic pressure indicated by this apparatus enables the amount of circulating water to be ascertained, a previous calibration having of course been provided.

What I claim and desire to secure by Letters Patent of the United States is:—

1. A radiator element comprising radiating walls of extremely thin sheet metal, a corrugated metal sheet fastened thereto, preferably by solder, forming an internal stay-sheet, and borders holding the said walls and sheet together.

2. A radiator element as specified in claim 1, in which the borders are arranged to laterally close the radiating walls, the said borders being of thin folded metal and soldered to the outer surfaces of the said walls parallel to the corrugations of the internal stay-sheet.

In testimony whereof I have affixed my signature in presence of two witnesses.

CHARLES CUAU.

Witnesses:
MARCEL GUILLEMOT,
CHAS. P. PRESSLY.